Patented Dec. 30, 1941

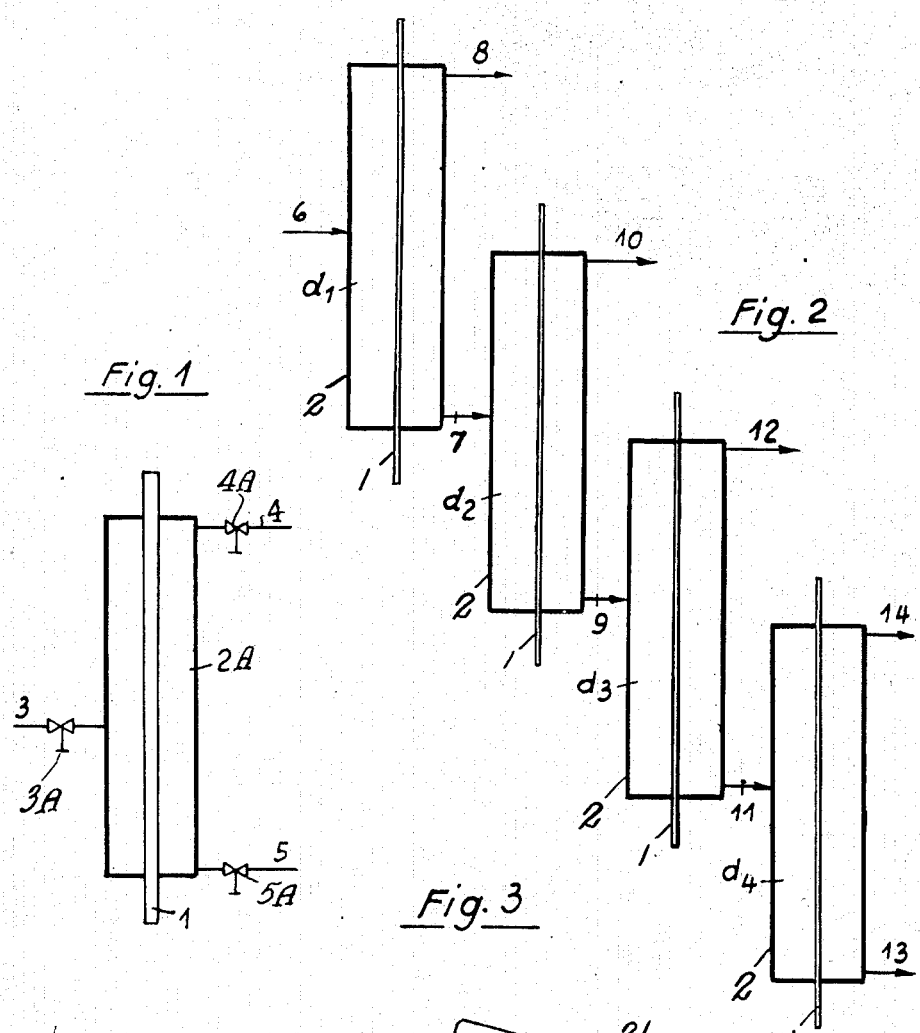
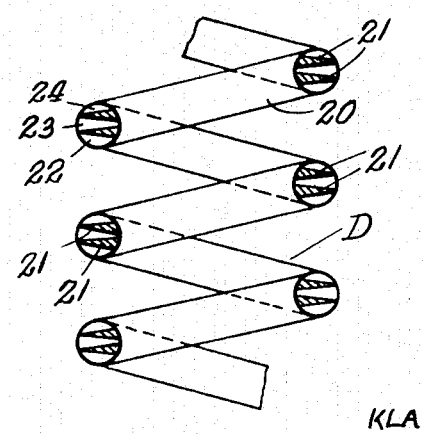

2,268,134

UNITED STATES PATENT OFFICE 2,268,134

PROCESS FOR THE SEPARATION OF GAS MIXTURES

Klaus Clusius, Munich, Germany, assignor to I. G. Farbenindustrie Aktiengesellschaft, Frankfort-on-the-Main, Germany Application April 3, 1939, Serial No. 265,865
In Germany April 4, 1938

6 Claims. (Cl. 183—115)

The present invention relates to a process for separating gas mixtures by thermal diffusion.

When in a gas mixture a difference of temperature is maintained, the gas mixture on account of the so-called thermal diffusion undergoes changes in composition at the places of different temperature. The variations of concentration, however, are only small even at considerable differences of temperature and, given an equal difference of temperature, they are the greater the more the atomic or molecular weights of the gaseous mixture constituents differ from each other.

It has already been proposed to separate mixtures which contain much argon but little krypton and xenon, into a fraction enriched in krypton and xenon on the one hand and practically pure argon on the other hand, by thermal diffusion. For this separation the gas mixture was passed in downward direction through a vertical tube with a radial drop in temperature, for example a tube which was cooled from outside and had an incandescent wire arranged along its longitudinal axis. At the bottom end at the outer parts of the tube, i. e. at the cold places, the fraction enriched in heavy noble gases was withdrawn, whereas the fraction deprived of the latter was withdrawn at the bottom end at the middle parts of the tube, i. e. at the hot places. In this case, therefore, the cold and the warm parts of the mixture to be separated are passed through the separator in the same direction of flow. By this method of operation it was possible, by adopting an equipment of 7 or 14 separators, respectively, arranged in series, to raise the contents of krypton and xenon in argon from 0.1 per cent. or 0.01 per cent., respectively, to 1 per cent. This enrichment, however, is so insignificant in comparison with the effectiveness of other separation methods, that the method above described has not so far gained any practical importance. It must be further noted that argon and krypton exhibit relatively strong effects by reason of their great difference in atomic weight.

I have now found that the dissociation of gas mixtures by thermal diffusion can be rendered much more effective, to the effect that mixtures of isotopes and azeotropic mixtures, too, may be separated by leading the warmer and colder parts of the mixture along each other in counter-current and leading them off separately. The motion of the colder and warmer parts of the mixture in counter-current to each other is preferably accomplished by thermo-syphon effect, i. e. by causing the hot gas mixture to ascend and the cold one to drop while leading both parts along each other in counter-current. The motion of both parts of the mixture in counter-current may also be performed, however, in another suitable manner, for example by means of horizontal disks rotating in opposite direction, the upper one being heated and the lower one being cooled. The formation of eddies should as far as possible be prevented by an appropriate construction of the separator so that both layers of gas are led along each other in an approximately laminar stream. Any increase in the difference of temperature or of the pressure of gas, which would cause an increased tendency towards eddy formation, must be levelled out by a decrease of the distance between the cold and the warm wall. On the other hand, any decrease of the difference of temperature or of the pressure allows of an increase of the distance. In the case of very long separators it may also be suitable for avoiding eddy formation to arrange sieves or nettings at intervals between the upper and lower end of the separator, most advantageously cross to the longitudinal axis.

When the process is carried out in a vertical separator the mixture to be separated is introduced between the upper and the lower end of the separator column, and the warmer parts of the mixture, i. e. the fraction enriched in the lighter constituents, are discharged at the top end of the column, whereas the colder parts of the mixture, i. e. the fraction enriched in heavier constituents, are discharged at the bottom end of the column. In place of one column there may equally be used several such columns in series and the separation be performed by introducing the fraction withdrawn from the preceding column to the consecutive column between the upper and the lower end thereof.

My present invention will be further described with reference to the accompanying drawing in which Fig. 1 diagrammatically represents in vertical section a vertical separator column. Fig. 2 illustrates diagrammatically and in vertical section a plurality of columns arranged in series, and Fig. 3 illustrates diagrammatically, in part in vertical section, a modified form of column. This column in Fig. 1 consists of two tubes 1 and 2 which are concentrically arranged to provide an annular free space 2—A, said tubes being kept at different temperatures. At one side of tube 2 intermediate the ends thereof there is provided an inlet tube 3 for the gas mixture to be separated into its components, said inlet tube being controlled by valve 3A. The opposite side of tube 2 is provided adjacent each end with an outlet tube 4 and 5 respectively, serving for the withdrawal of the separated components. Tube 4 is controlled by valve 4A and tube 5 by valve 5A.

It is immaterial whether the inner tube is heated and the outer one cooled, or vice versa; in the embodiment of my invention which I am going to illustrate with reference to Fig. 1, I have availed myself of the former possibility. When the gas mixture, for example a mixture of nitrogen and oxygen, enters the separator through tube 3, the following takes place:

The thermal diffusion brings about a variation in concentration in radial direction to the effect that the heavier oxygen accumulates in the outer, and the lighter nitrogen accumulates in the inner part of the annular space between the tubes 1 and 2. At the same time the warmed gas in the neighbourhood of the tube 1 is caused to ascend there, whereas the cooled gas in the neighbourhood of the tube 2 is caused to fall down there. A fraction enriched in nitrogen is led off through tube 4, whereas a fraction enriched in oxygen is led off through tube 5.

Mixtures may thus be separated by thermal diffusion in a simple manner while leading the colder and warmer parts of the mixture along each other in counter-current. In this way the effect of the thermal diffusion is intensified similarly as the effect of an ordinary distillation in a rectifier column.

Fig. 2 diagrammatically represents an apparatus for separating gas mixtures in a multi-stage process. For this purpose there are provided 4 columns $d_1$, $d_2$, $d_3$ and $d_4$, each of which is of the type of the column of Figure 1, said four columns being arranged in vertical series. Each column has its lower end connected to the annular free space of the next adjacent column at a point intermediate the ends of the latter by tubes 7, 9 and 11 respectively. Each column is provided at its upper end with exit tubes 8, 10 and 12 respectively. Gas to be separated into its components is fed to the system by an inlet tube 6 arranged on column $d_1$. Column $d_4$ is provided at its lowermost end with an exit tube 13. The device operates as follows: The mixture to be separated is first introduced through tube 6 into a separator $d_1$. The fraction, enriched in heavy constituents, which is withdrawn from the separator $d_1$ through tube 7, is supplied to the separator $d_2$ between the upper and lower end thereof. In an analogous manner the fractions containing heavier constituents are withdrawn from the separators $d_2$ and $d_3$ through the tubes 9 and 11 and supplied to the separators $d_3$ and $d_4$, respectively, between the top and bottom end thereof. Ultimately the heaviest fraction may be withdrawn through tube 13, whereas lighter fractions are withdrawn through the tubes 14, 12, 10 and 8.

In practice the process according to the present invention is by no means dependent upon certain separators or a certain range of temperature. Thus use may also be made for example of two plates or profiles of different temperature arranged opposite each other. Moreover, the gas layers of different temperature need not be led along each other in vertical direction, provided intermixing of the two layers by eddies is practically avoided. For example hollow spaces arranged in an inclined position or wound up to form spirals may also be used if provision be made for their upper surface to be heated to a higher temperature than their lower surface. Thus in Figure 3 the column $d$ is shown in the form of a spiral tube 20. Positioned in the tube are plates 21 which divide the tube into the hollow spaces 22, 23 and 24. This modification allows of accommodating great lengths of the separator within a comparatively small space.

The following examples serve to illustrate how the present invention can be carried out in practice, but the invention is not restricted to these examples.

*Example 1*

A vertical tube of 2.6 meters in length and 11 millimeters in diameter, having an incandescent wire arranged along its longitudinal axis, was filled with normal neon having an atomic weight of 20.18. The top end of the tube communicated with a large closed supply tank filled with neon. Between the incandescent wire and the outer wall of the tube a difference of temperature of 600° C. was maintained. After some time neon of an atomic weight of 20.68 could be withdrawn at the bottom end of the tube, which consisted of 34 per cent. of neon-isotope having an atomic weight of 20, and of 66 per cent. of neon-isotope having an atomic weight of 22, while the normal neon consists of 9 per cent. only of the neon-isotope of an atomic weight of 22 and 91 per cent. of the neon-isotope of an atomic weight of 20.

*Example 2*

A tube, 36 meters in length and 9 millimeters in diameter, having an incandescent wire arranged along its longitudinal axis and cross sieves all over its length at intervals of about 1 meter, was continuously charged with hydrogen chloride (atomic weight of chlorine 35.457) at a point 29 meters above the bottom end. Between the incandescent wire and the outer wall a difference of temperature of about 650° C. was maintained. At the bottom end of the separator tube there were daily withdrawn 8 cubic centimeters of heavier hydrogen chloride, the chlorine of which had an atomic weight of 36.956 which comes up to a content of 99.4 per cent. of chlorine-isotope with an atomic weight of about 37. At the top end of the separator tube there were daily withdrawn 25 cubic centimeters of lighter hydrogen chloride the chlorine of which had an atomic weight of 35.06, which comes up to a content of only 4.5 per cent. of the chlorine-isotope of the atomic weight of about 37.

Normal chlorine, for comparison, contains 24.5 per cent. of the chlorine-isotope of the atomic weight of about 37 and 75.5 per cent. of the chlorine-isotope of the atomic weight of about 35.

What I claim is:

1. A process for separating gases by thermal diffusion which comprises confining a body of gas between two elongated surfaces, maintaining said surfaces at different temperatures, setting up a circulation of the confined gas in such manner that it flows in one direction along one surface and in the opposite direction along the other, and withdrawing the lighter constituents from one end of said body of gas and the heavier from the other.

2. A process for separating gases by thermal diffusion which comprises confining a body of gas between two elongated surfaces, maintaining said surfaces at different temperatures, setting up a circulation of the confined gas by thermosyphon effect in such manner that it flows in one direction along one surface and in the opposite direction along the other, and withdrawing the lighter constituents from one end of said body of gas and the heavier constituents from the other.

3. A process for separating gases by thermal diffusion which comprises confining a body of gas between two elongated surfaces, maintaining said surfaces at different temperatures, setting up an eddy-free circulation of the confined gas by thermosyphon effect in such manner that it flows in one direction along one surface and in the opposite direction along the other, and withdrawing the lighter constituents from one end of said body of gas and the heavier constituents from the other.

4. A process for separating gases by thermal diffusion which comprises confining a body of gas between two vertically arranged elongated surfaces, maintaining said surfaces at different temperatures, setting up a circulation of the confined gas in such manner that it flows in one direction along one surface and in the opposite direction along the other, introducing between the upper and the lower end of the separating device the mixture to be separated, and withdrawing the lighter constituents from the top end and the heavier constituents from the bottom end of the device.

5. A process for separating gases by thermal diffusion which comprises confining a body of gas in several devices arranged in series, each device substantially consisting of two elongated surfaces vertically arranged and maintained at different temperatures, setting up in each device a circulation of the confined gas in such manner that it flows in one direction along one surface and in the opposite direction along the other, withdrawing the lighter constituents from the top end and the heavier constituents from the bottom end of each device, and introducing the fraction withdrawn from the preceding separating device to the consecutive separating device between the upper and the lower end thereof.

6. A process for separating gases by thermal diffusion which comprises confining a body of gas in several devices arranged in series, each device substantially consisting of two elongated surfaces vertically arranged and maintained at different temperatures, setting up in each device a circulation of the confined gas in such manner that it flows in one direction along one surface and in the opposite direction along the other, withdrawing the lighter constituents from the top end and the heavier constituents from the bottom end of each device, and introducing the colder parts withdrawn from the bottom end of the preceding separating device to the consecutive separating device between the upper and the lower end thereof.

KLAUS CLUSIUS.